US010668901B2

(12) United States Patent
Han et al.

(10) Patent No.: US 10,668,901 B2
(45) Date of Patent: Jun. 2, 2020

(54) SERVICE JACK SYSTEM

(71) Applicant: Joy MM Delaware, Inc., Wilmington, DE (US)

(72) Inventors: Jianjun Han, Gracemere (AU); Francois Nortje, Rockhampton (AU)

(73) Assignee: Joy Global Underground Mining LLC, Warrendale, PA (US)

( * ) Notice: Subject to any disclaimer, the term of this patent is extended or adjusted under 35 U.S.C. 154(b) by 210 days.

(21) Appl. No.: 15/858,879

(22) Filed: Dec. 29, 2017

(65) Prior Publication Data

US 2018/0186347 A1    Jul. 5, 2018

Related U.S. Application Data

(60) Provisional application No. 62/441,009, filed on Dec. 30, 2016.

(51) Int. Cl.
| | | |
|---|---|---|
| *B60S 9/12* | (2006.01) | |
| *B60P 1/02* | (2006.01) | |
| *E21F 13/02* | (2006.01) | |
| *B60P 1/36* | (2006.01) | |

(52) U.S. Cl.
CPC . *B60S 9/12* (2013.01); *B60P 1/02* (2013.01); *B60P 1/36* (2013.01); *E21F 13/025* (2013.01)

(58) Field of Classification Search
CPC ...... B66F 3/30; B66F 3/28; B66F 3/00; B66F 3/08; B66F 3/10; B66F 3/24; B66F 3/247; B66F 3/26; B60S 9/00; B60S 9/02; B60S 9/04; B60S 9/06; B60S 9/08; B60S 9/10; B60S 9/12
See application file for complete search history.

(56) References Cited

U.S. PATENT DOCUMENTS

| | | | |
|---|---|---|---|
| 1,047,007 A | 12/1912 | Drugan | |
| 1,711,565 A | 5/1929 | Hatfield et al. | |
| 2,443,209 A | 6/1948 | Thornburg | |
| 2,570,334 A | 10/1951 | Erjavec | |
| 2,724,572 A | 11/1955 | Weinberg | |
| 2,837,312 A | 6/1958 | Troche | |
| 2,917,277 A * | 12/1959 | Pine | F15B 15/04 92/19 |
| 3,020,858 A | 2/1962 | Perkins et al. | |
| 3,321,182 A | 5/1967 | Elenburg | |

(Continued)

OTHER PUBLICATIONS

International Search Report and Written Opinion for Application No. PCT/US17/69068 dated Mar. 26, 2018 (14 pages).

*Primary Examiner* — Tyrone V Hall, Jr.
(74) *Attorney, Agent, or Firm* — Michael Best & Friedrich LLP

(57) ABSTRACT

A jack for a vehicle includes a tube configured to be coupled to a chassis, and a cylinder assembly supported by the tube. The cylinder assembly includes a barrel and a rod at least partially received within the barrel. Actuation of the cylinder assembly causes the barrel to move relative to the tube in a first direction parallel to a longitudinal axis of the tube while the rod remains stationary relative to the tube. In some aspects, the jack further includes a locking device selectively received within the tube in a locked position. The locking device intersects the barrel's path to inhibit movement of the barrel in a second direction opposite the first direction when the locking device is in the locked position.

21 Claims, 9 Drawing Sheets

(56) References Cited

U.S. PATENT DOCUMENTS

| | | |
|---|---|---|
| 3,664,486 A | 5/1972 | Mares |
| 3,871,685 A | 3/1975 | Senelet |
| 3,897,044 A * | 7/1975 | Tallman ............... B60S 9/12 |
| | | 254/45 |
| 4,174,094 A | 11/1979 | Valdespino et al. |
| 4,417,637 A | 11/1983 | Hardy et al. |
| 4,449,734 A | 5/1984 | Cory |
| 4,508,391 A | 4/1985 | Spektor et al. |
| 4,593,932 A | 6/1986 | Miyazawa |
| 5,224,688 A * | 7/1993 | Torres ................ B60S 9/12 |
| | | 254/423 |
| 5,377,957 A | 1/1995 | Mosley |
| 5,465,940 A | 11/1995 | Guzman et al. |
| 6,099,034 A | 8/2000 | Fukishima |
| 6,895,648 B1 | 5/2005 | Willett |
| 6,902,148 B1 | 6/2005 | Spencer |
| 7,004,457 B2 | 2/2006 | Jackson, Sr. et al. |
| 7,334,777 B2 | 2/2008 | Jackson |
| 8,944,157 B2 | 2/2015 | Mail |
| 9,400,080 B2 | 6/2016 | Chen |
| 2003/0205421 A1 * | 11/2003 | Allen .................. B60L 3/04 |
| | | 180/65.1 |
| 2009/0008917 A1 | 1/2009 | Daniel |
| 2015/0129821 A1 | 5/2015 | Dickerson |

* cited by examiner

SERVICE JACK SYSTEM

CROSS-REFERENCE TO RELATED APPLICATION

This application claims priority to U.S. Provisional Patent Application No. 62/441,009 filed Dec. 30, 2016, the entire contents of which are incorporated by reference herein.

BACKGROUND

The present disclosure relates to service jacks, and particularly to a fluid jack for an underground vehicle.

SUMMARY

Conventional service jacks include a piston cylinder assembly having a piston slidably received within a cylinder. Pressurized fluid is pumped to the piston cylinder assembly to actuate the piston. In some embodiments, the piston applies a force directly to the load whereas others apply the force to a working element (i.e., mechanical lever) to indirectly transfer the force to a load.

In one aspect, a jack for a vehicle having a chassis includes a tube configured to be coupled to the chassis, a cylinder assembly supported by the tube, and a locking device. The cylinder assembly includes a barrel and a rod at least partially received within the barrel. Actuation of the cylinder assembly causes the barrel to move relative to the tube in a first direction parallel to a longitudinal axis of the tube while the rod remains stationary relative to the tube. The locking device is selectively received within the mounting tube in a locked position. The locking device intersects the barrel's path to inhibit movement of the barrel in a second direction opposite the first direction when the locking device is in the locked position.

In another aspect, a shuttle car includes a chassis, a bed for supporting material, traction members for supporting the chassis for movement, and a plurality of jacks secured to the chassis. The bed includes a conveyor device for moving material relative to the bed. Each jack includes a tube coupled to the chassis, a cylinder assembly supported by the tube, and a locking device. The cylinder assembly includes a barrel and a rod at least partially received within the barrel. Actuation of the cylinder assembly causes the barrel to move relative to the tube in a first direction parallel to a longitudinal axis of the tube while the rod remains stationary relative to the tube. The locking device is selectively positionable in a locked position in which the locking device engages the mounting tube and at least partially inhibits the barrel from moving in a second direction opposite the first direction.

In yet another aspect, a jack for a vehicle having a chassis includes a tube configured to be coupled to the chassis, and a cylinder assembly supported by the tube. The cylinder assembly includes a barrel and a rod at least partially received within the barrel. Actuation of the cylinder assembly causes the barrel to move relative to the tube in a first direction parallel to a longitudinal axis of the tube while the rod remains stationary relative to the tube.

Other aspects will become apparent by consideration of the detailed description and accompanying drawings.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Figure 1:
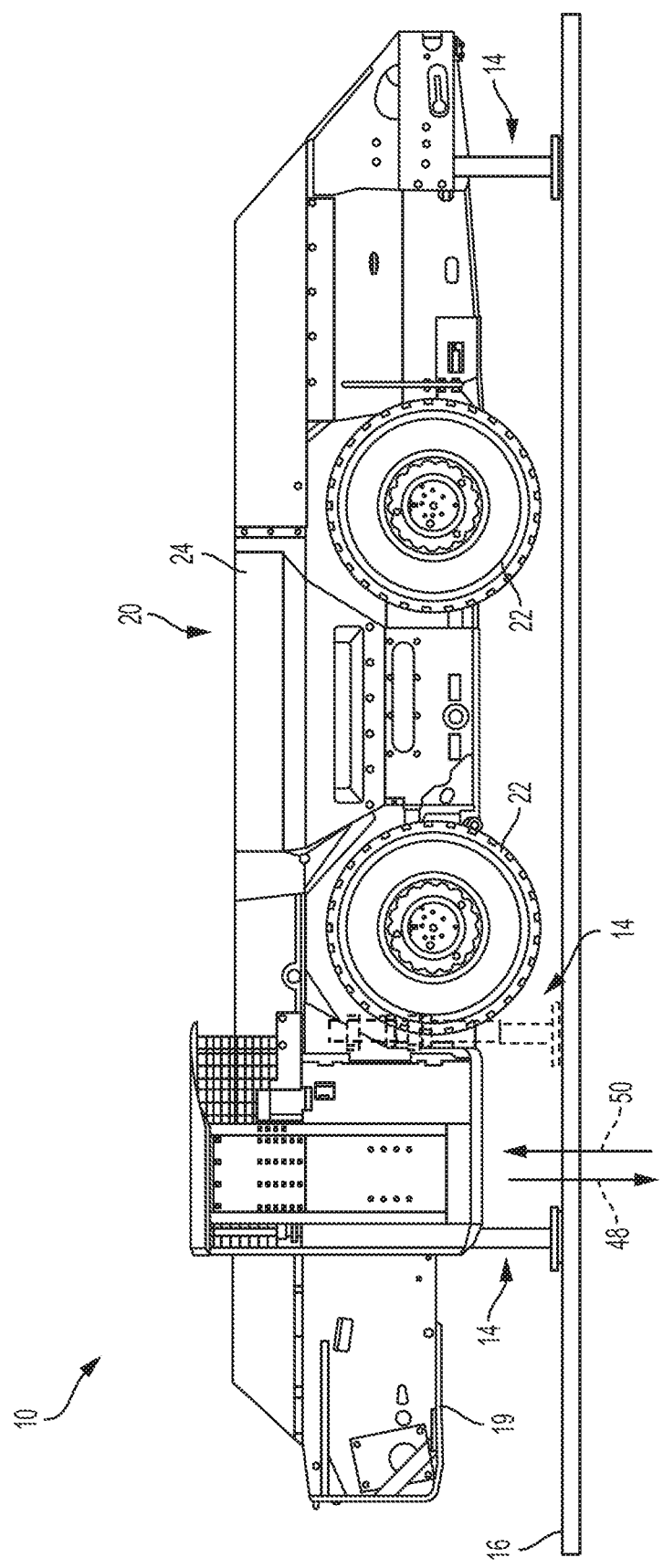
FIG. 1 is a side view of a vehicle according to one embodiment.
Figure 2:
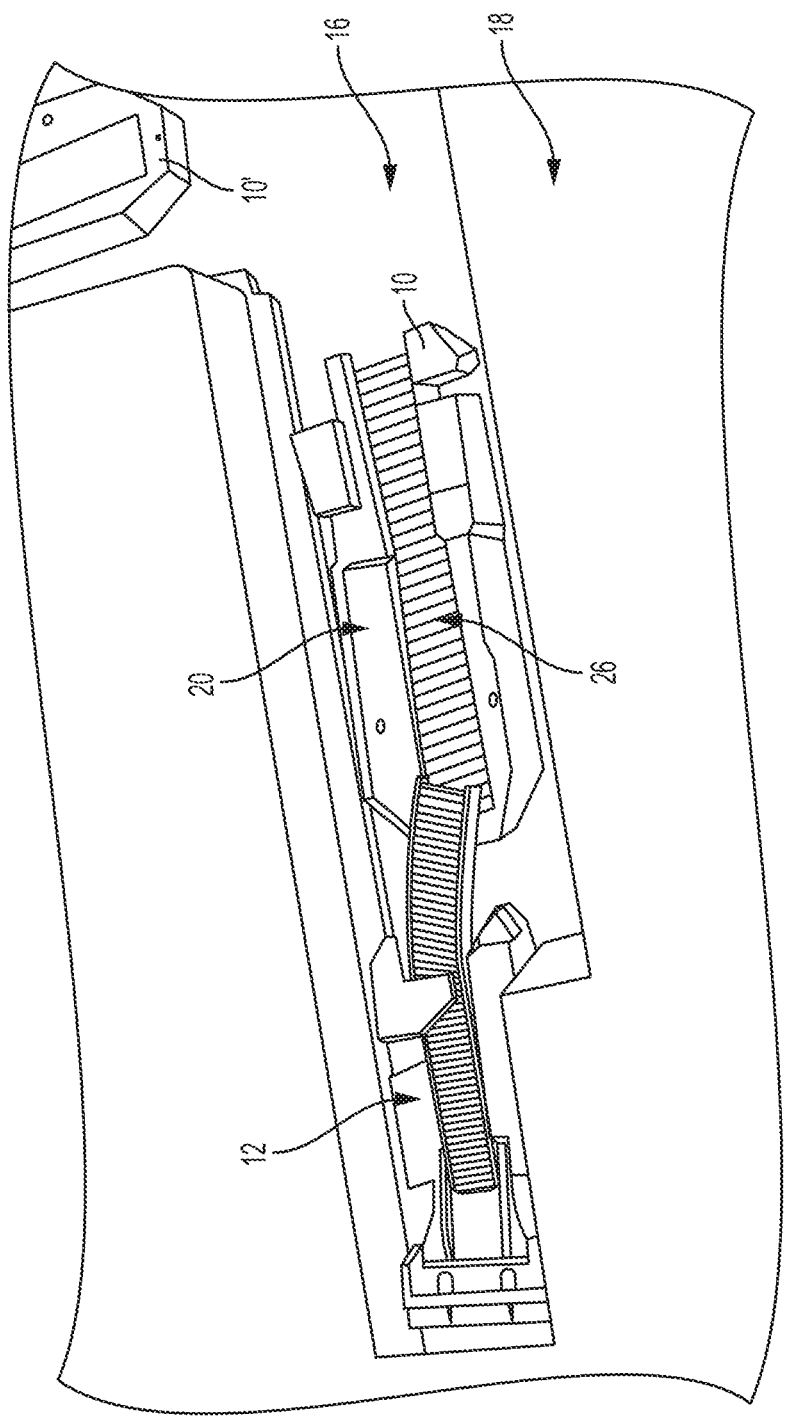
FIG. 2 is a perspective view of the vehicle of FIG. 1 receiving material from a mining machine.

FIGS. 1 and 2 illustrate an underground haulage vehicle, such as a shuttle car 10, operable to receive collected material from a mining machine 12. The vehicle includes a plurality of jack systems 14. For example, the mining machine 12 may be a continuous mining machine for cutting material from a wall of a mine 18, and including a conveyor for transporting the cut material toward the rear of the machine 12 to the shuttle car 10. The shuttle car 10 is movable along a floor 16 of a mine 18 for receiving, transporting, and transferring cut material.

In the illustrated embodiment, the shuttle car 10 includes a chassis or frame 19, a receptacle or bed 20, and traction members (e.g., steerable wheels 22) coupled to the frame 19. The bed 20 of the shuttle car 10 defines a top opening 24 for receiving the material and includes a conveyor 26 for discharging material from the bed 20. In some embodiments, a funnel or chute 28 (FIG. 3) may be formed along the walls of the bed 20 for guiding the material toward the conveyor 26. The wheels 22 of the illustrated embodiment are engageable with a floor 16 of a mine 18, and thus support the frame 19 for movement along the floor 16. The shuttle car 10 may transfer the material to other vehicles (e.g., other shuttle cars) or to conveyor systems (not shown).

Figure 3:
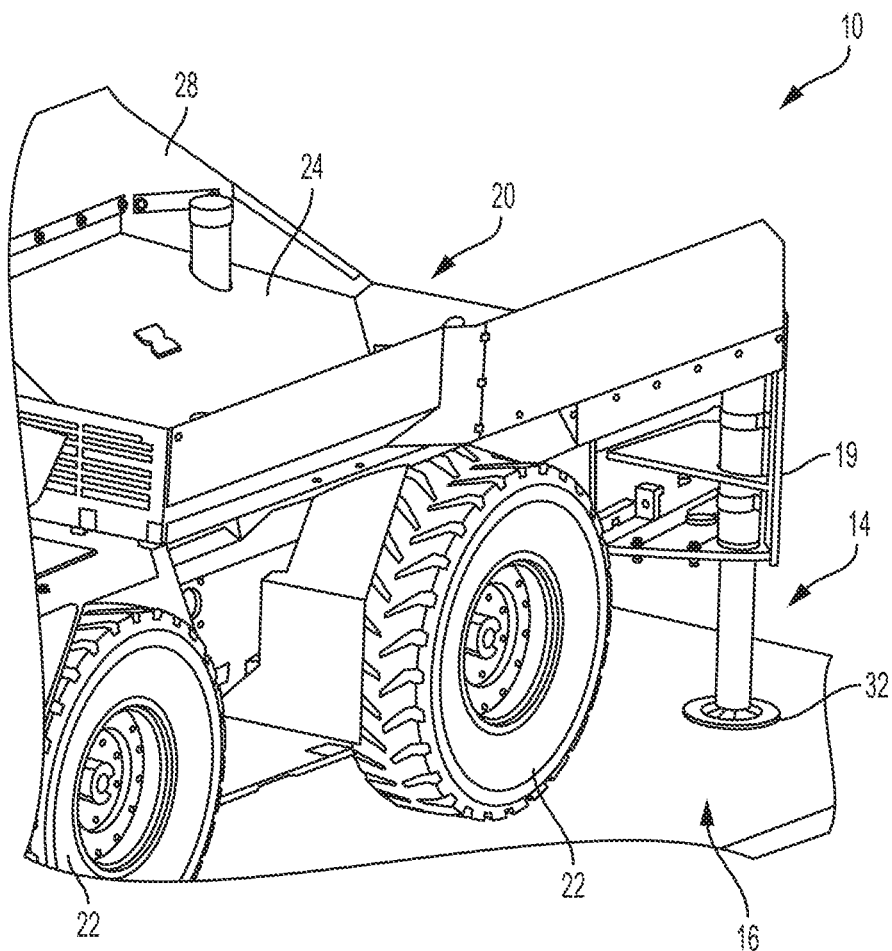
FIG. 3 is a perspective view of a portion of the vehicle of FIG. 1, including a service jack system.
Figure 4:
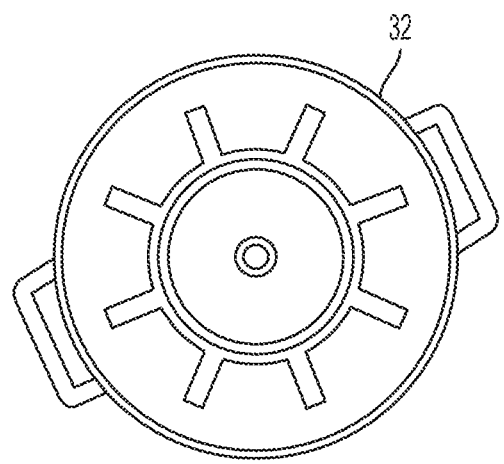
FIG. 4 is an end view of a pad for the service jack system of FIG. 3.

Referring to FIG. 3, the jack systems 14 are coupled to the frame 19 of the shuttle car 10. In some embodiments, the jack systems 14 can be coupled adjacent the wheels 22. For example, the jack systems 14 may be mounted within the wheel-wells of the chassis 19, as shown in phantom lines in FIG. 1. As shown in FIGS. 3 and 4, each jack system 14 includes a pad 32 coupled to an end of the jack for engaging the floor 16 of the mine 18. In some embodiments, the pads 32 are removably coupled to the end of the jack and provide a wear element. Each jack system 14 is substantially identical, although may be oriented differently for mounting purposes and to permit access to the locking device. For the sake of brevity, only one of the jack systems 14 will be subsequently described.

Figure 5:
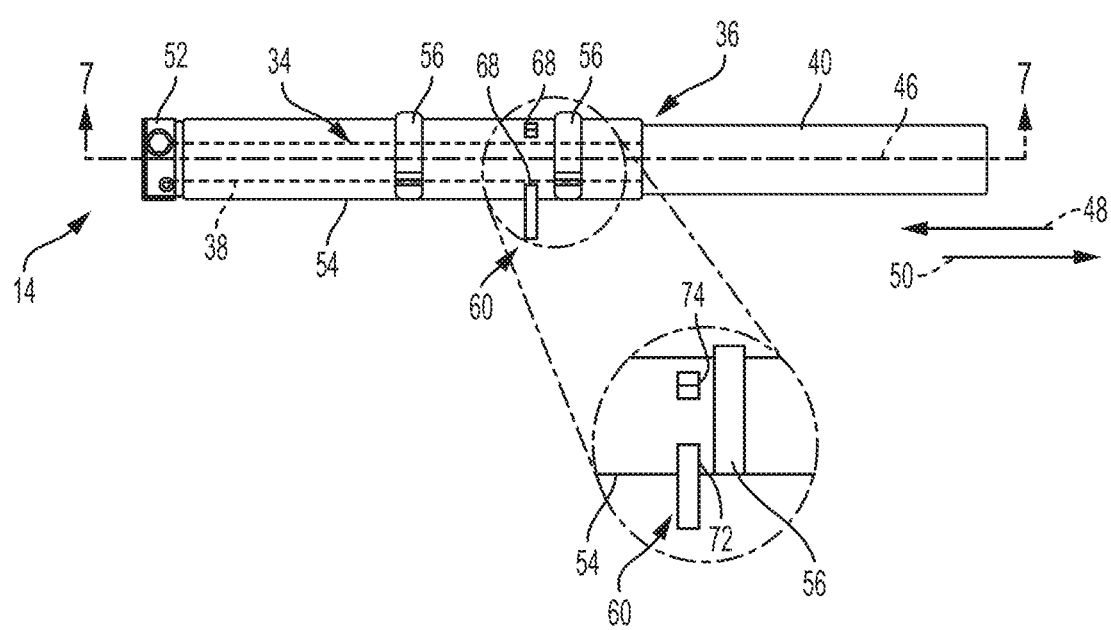
FIG. 5 is a side view of the service jack system of FIG. 3 in an extended state.
Figure 6:
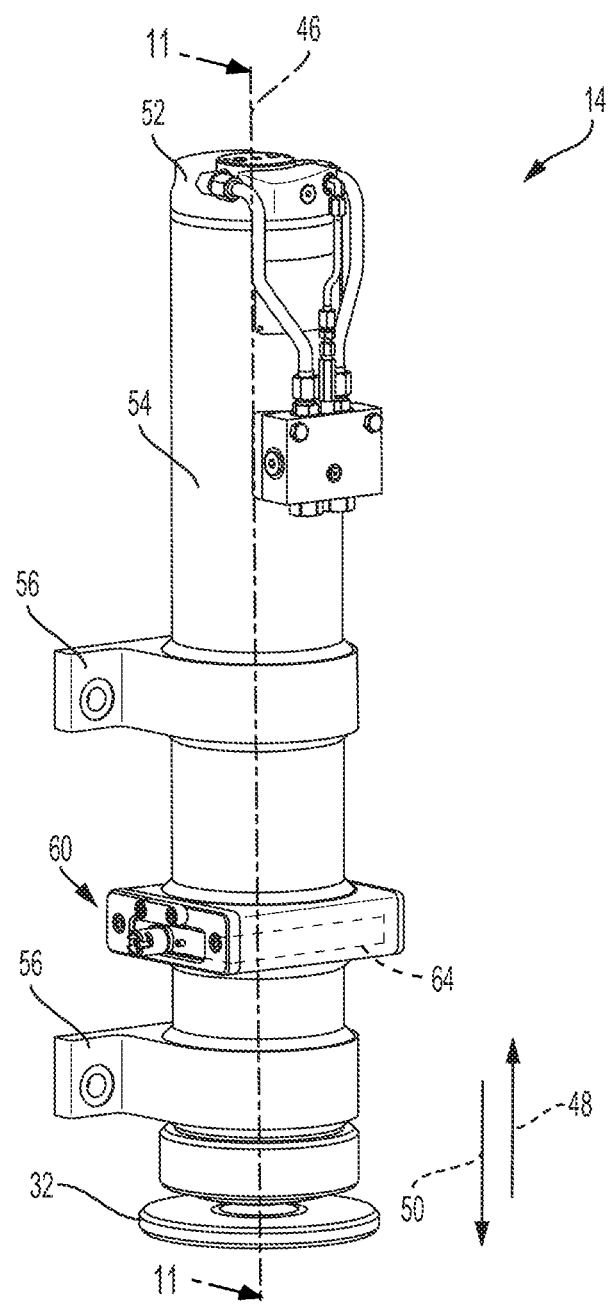
FIG. 6 is a perspective view of a service jack system according to another embodiment, illustrating the service jack system in a retracted state.

As shown in FIGS. 5 and 6, each jack system 14 includes a lifting device, such as a fluid jack 34. The jack 34 includes a cylinder assembly 36 having a rod 38 received within a barrel 40. The rod 38 is coupled to a piston 42 (FIG. 7) positioned within the barrel 40. The barrel 40 and the piston 42 define a chamber 44 (FIG. 7) within the barrel 40. While conventional cylinder assemblies may include a piston slidably received within a barrel such that the barrel remains stationary while the piston and the rod move relative to the barrel, the rod 38 is stationary such that it does not move relative to the frame 19 of the shuttle car 10. The barrel 40 of the fluid jack 34 is movable relative to the piston 42 and relative to the frame 19 along a longitudinal axis 46. Specifically, the barrel 40 extends along the longitudinal axis 46 in a first direction 48 towards a first or extended position (FIG. 5) and retracts along the longitudinal axis 46 in a second direction 50 towards a second or retracted position (FIG. 6).

Figure 7:
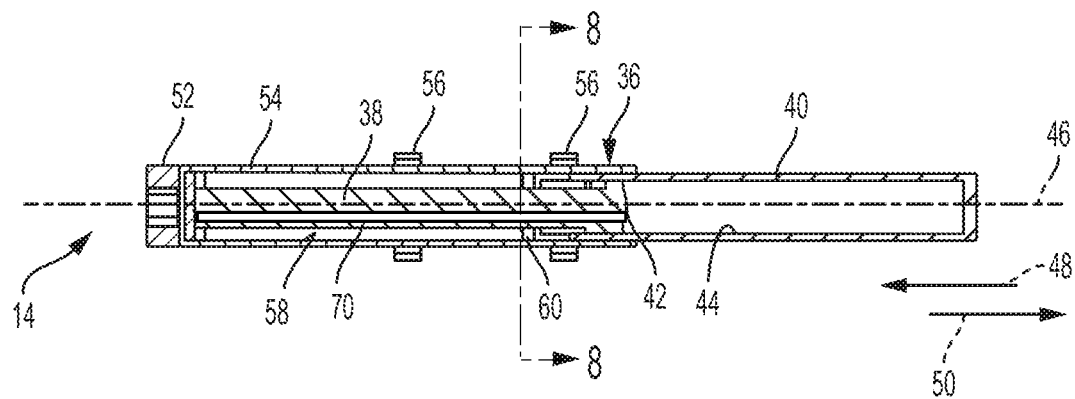
FIG. 7 is a cross-section view of the service jack system of FIG. 5, viewed along section 7-7.
Figure 11:
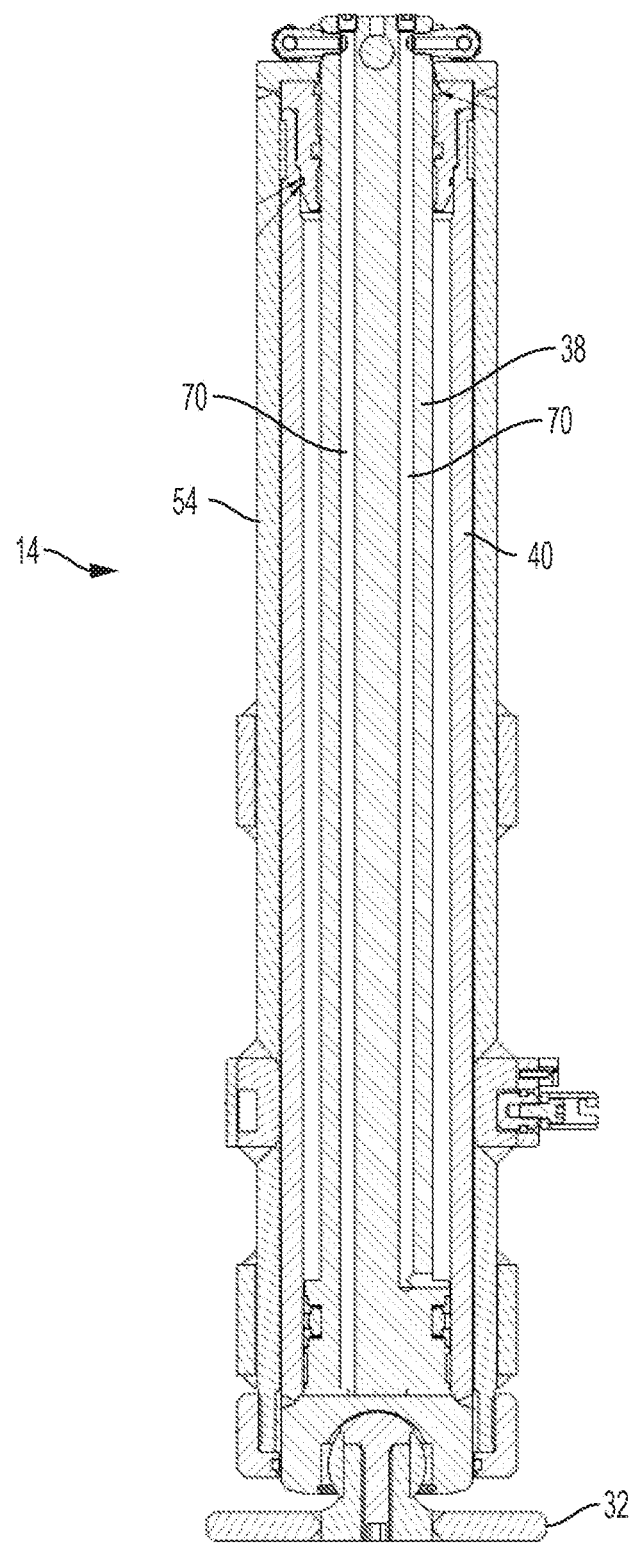
FIG. 11 is a cross-section view of the service jack system of FIG. 6, viewed along section 11-11.

The barrel 40 moves relative to the piston 42 in response to a force differential between the opposing sides of the piston 42 (i.e., the rod side and the cap side). The force differential may be caused by pressurized fluid in the chamber 44 exerting a larger force on the cap side of the piston 42 than the force/load exerted on the rod side. As shown in FIG. 7, the pressurized fluid is introduced into the chamber 44 via fluid passages or porting 70 extending through the rod 38 of the cylinder assembly 36. Some embodiments of the cylinder assembly 36 may have more than one fluid passage or portings 70 extending through the rod 38, as shown in FIG. 11. The jack 34 further includes a manifold 52 and fluid lines (e.g., piping; FIG. 6) that are coupled to the rod 38, and the manifold 52 is in fluid communication with the fluid passages 70 of the rod 38 to direct pressurized fluid into or out of the chamber 44. In the illustrated embodiment, the cylinder assembly 36 is a double-acting cylinder. That is, pressurized fluid is introduced to the cap-side of the piston 42 to extend the barrel 40 and is introduced to the rod-side of the piston 42 to retract the barrel 40. In other embodiments, the cylinder assembly can be a single-acting cylinder.

Although not illustrated, the cylinder assembly 36 can have multiple barrels and/or multiple barrel portions that telescope relative to each other. In some cases, such a telescoping arrangement can be advantageous to provide a compact cylinder assembly while still providing a desired lifting height.

Referring again to FIGS. 5 and 6, the jack 34 further includes a mounting tube 54. The mounting tube 54 is secured to the shuttle car 10. Specifically, the mounting tube 54 includes mounting brackets 56 for securing the mounting tube 54 to the frame 19 of the shuttle car 10. The mounting tube 54 also encases at least a portion of the cylinder assembly 36 and is rigidly coupled to the rod 38 and the manifold 52. Therefore, the barrel 40 moves along the longitudinal axis 46 relative to the mounting tube 54, while the rod 38 and the mounting tube 54 remain stationary.

When the barrel 40 is in the extended position, an annular air gap 58 (FIG. 7) exists between the rod 38 and the mounting tube 54, essentially forming a pocket that receives the barrel 40 when the barrel 40 is in the retracted position. In some embodiments, an oil injector is provided within the cylinder assembly 36 for lubricating the sliding surfaces between the cylinder assembly 36 and the mounting tube 54. Oil may be injected into the cavity when the cylinder assembly is in an extended position.

Figure 8:
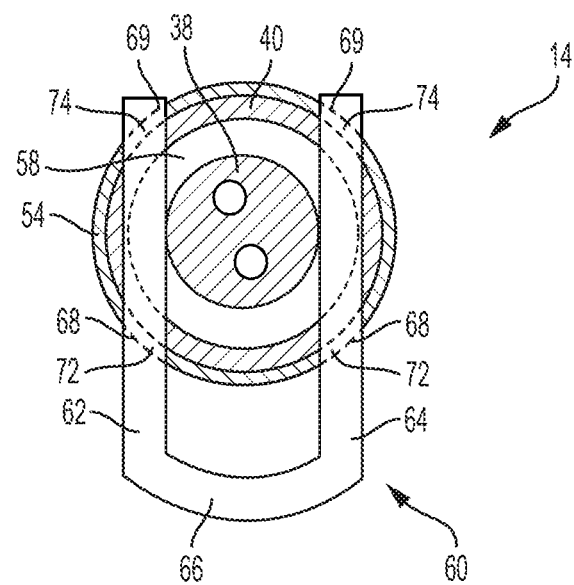
FIG. 8 is a cross-sectional view of the service jack system of FIG. 5, viewed along section 8-8.
Figure 9:
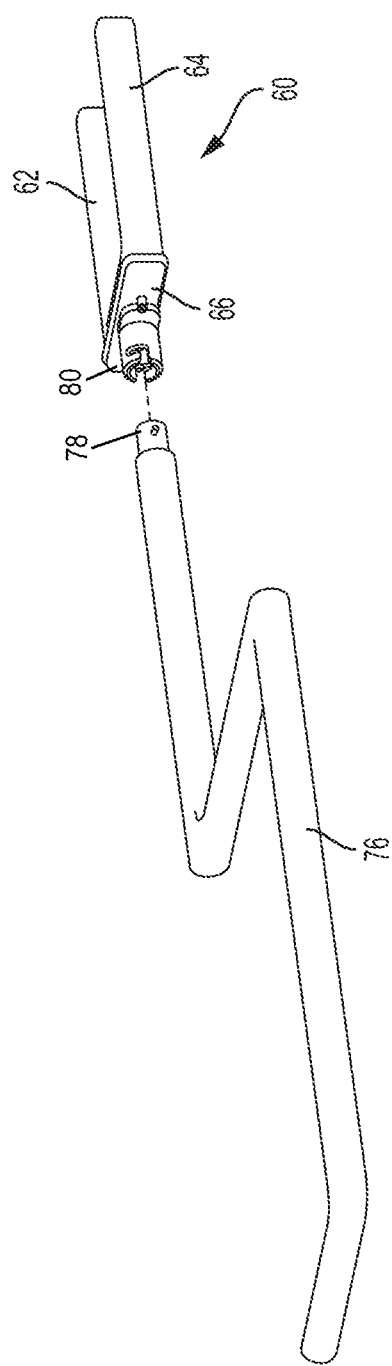
FIG. 9 is a perspective view of a locking device and lever.
Figure 10:
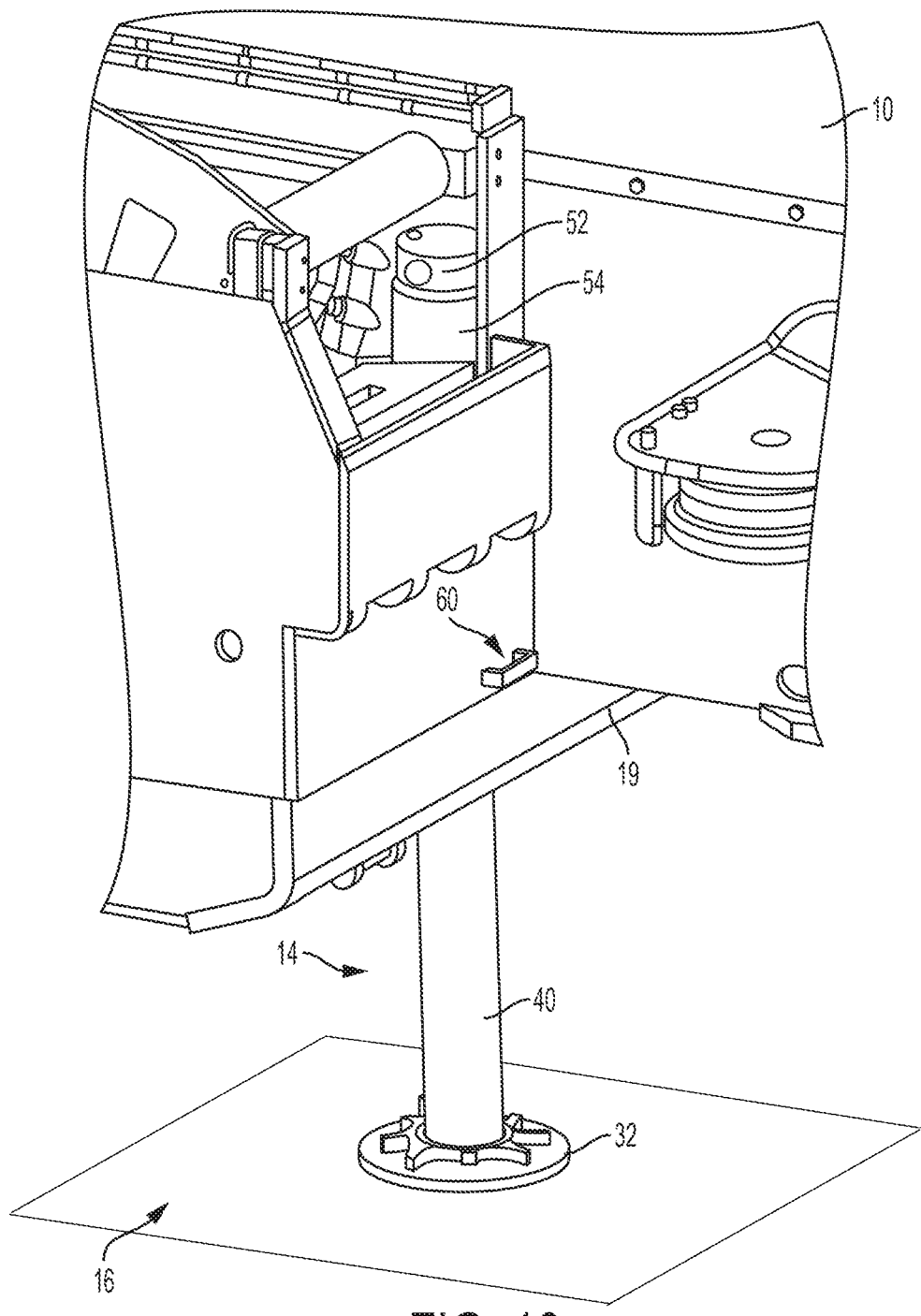
FIG. 10 is a perspective view of a portion of the vehicle and the service jack system.

With reference to FIGS. 5-9, the jack 34 further includes a locking device 60 to lock the barrel 40 relative to the rod 38 and the mounting tube 54. The locking device 60 is substantially U-shaped such that the locking device 60 includes a first leg 62, a second leg 64, and a handle 66. The locking device 60 is moveable relative to the mounting tube 54 in a direction perpendicular to the longitudinal axis 46 between a locked position and an unlocked position. As best shown in FIG. 8, in the locked position, the two legs 62, 64 of the locking device 60 are inserted through apertures 68, 69 on one side of the mounting tube 54 and engage corresponding grooves or apertures 68, 69 on an opposite side of the mounting tube 54. As a result, each leg 62, 64 of the locking device 60 is in contact with two separate bearing regions 72, 74 of the mounting tube 54, positioned on opposite sides of the longitudinal axis 46. As such, loads exerted on the locking device 60 are evenly distributed along each leg 62, 64.

In the locked position, each leg 62, 64 extends through the annular air gap 58 to mechanically inhibit movement of the barrel 40 toward the retracted position and provides a failsafe in case of a sudden loss of power or pressure in the barrel 40. In the unlocked position, each leg 62, 64 of the locking device 60 is removed from the annular air gap 58, thereby permitting movement of the barrel 40 between the extended and retracted positions. The handle 66 of the locking device 60 is accessible from the outer perimeter of the shuttle car 10 (i.e., the side of the shuttle car 10) such that an operator can actuate the locking device 60 between the locked position and the unlocked position without being positioned underneath the shuttle car 10. In some embodiments, the locking device 60 includes a lever 76 (FIG. 9) that is selectively coupled to the handle 66. In the illustrated embodiment, an end of the lever 76 includes a key 78 that engages a device 80 (e.g., a slotted tube) on an end of the locking device 60. The device 80 is rotatable to prevent the locking device 60 from falling out or being unintentionally removed from the locked position in the mounting tube. A user may insert the key 78 and actuate the device 80 to lock the locking device 60. The lever 76 also extends the length of the handle 66 to allow a user to access the locking device 60 from the outer perimeter of the shuttle car 10.

In operation, the shuttle car 10 can be raised to lift the wheels 22 off the floor 16 of the mine 18 in order to stabilize the shuttle car 10 during periods of maintenance or loading and unloading cut material into the receptacle 20. To raise the shuttle car 10, pressurized fluid flows to each service jack system 14 through the manifold 52, the fluid passages 70 of the rod 38, and into the chamber 44. When pressurized fluid is introduced into the chamber 44 adjacent the cap-side of the piston 42, the barrel 40 extends away from the rod 38 in the first direction 48. FIG. 5 illustrates the barrel 40 extended in the first direction 48 such that the barrel 40 is in the extended position. At this point, the operator may manually actuate or insert the locking device 60 for each jack system 14 from the unlocked position to the locked position via the handle 66 while standing adjacent the side of each jack system 14. Each leg 62, 64 of the locking device

60 extends through the annular air gap 58 to mechanically inhibit movement of the barrel 40.

When the operator desires to lower the shuttle car 10 to the floor 16 of the mine 18, the operator moves the locking device 60 of each jack system 14 from the locked position to the unlocked position, such that the locking device 60 is pulled free from the mounting tube 54. As such, each leg 62, 64 of the locking device 60 is removed from the annular air gap 58 to permit movement of the barrel 40 along the longitudinal axis 46. Again, the operator need not be positioned underneath the shuttle car 10 to move the locking device 60 to the unlocked position. To retract the barrel 40, pressurized fluid is discharged from a portion of the chamber 44 adjacent the cap-side of the piston 42 through the rod 38 and the manifold 52. Simultaneously, pressurized fluid is introduced into a portion of the chamber 44 adjacent the rod side of the piston 42 to move the barrel 40 from the extended position toward the retracted position. FIG. 6 illustrates the barrel 40 retracted entirely in the second direction 50 such that the barrel 40 is in the retracted position. Once retracted a plug (not shown) may be installed where the locking device 60 is removed to prevent ingress of foreign material.

The present invention is advantageous since the locking device 60 eliminates the use of large, heavy locking sprags that are installed around the jack. Also, installation of conventional locking sprags requires an operator to be positioned under an unsupported load to position each sprag. The use of such sprags can cause serious injury to the operator while maneuvering the large, heavy sprag and positioning the sprag under an unsupported load. The locking device 60 is lightweight and can be accessed easily such that the operator does not need be positioned under an unsupported load. The design can be mounted on existing mounting plates at the loading and discharging end of the shuttle car 10, and can be mounted in a cab and/or a cable reel compartment or front wheel-wells of the shuttle car 10 with minor modification. While each jack system 14 is substantially identical, there may be some minor differences such as the insertion point for the locking device being located differently on each jack system 14 due to mounting orientation. Each jack system 14 is oriented relative to the shuttle car 10 to allow for optimum access to install the locking device 60 from the outer perimeter of the shuttle car 10.

Embodiments described above and illustrated in the figures are presented by way of example only and are not intended as a limitation upon the concepts and principles presented herein. As such, it will be appreciated that variations in the elements and their configuration and arrangement are possible without departing from the spirit and scope of one or more independent aspects as described. Various features and advantages are set forth in the following claims.

What is claimed is:

1. A jack for a vehicle having a chassis, the jack comprising:
    a tube configured to be coupled to the chassis;
    a cylinder assembly supported by the tube, the cylinder assembly including a barrel and a rod at least partially received within the barrel, actuation of the cylinder assembly causing the barrel to move relative to the tube in a first direction parallel to a longitudinal axis of the tube while the rod remains stationary relative to the tube; and
    a locking device selectively received within the tube in a locked position, the locking device intersecting the barrel's path to inhibit movement of the barrel in a second direction opposite the first direction when the locking device is in the locked position, the locking device including a first leg and a second leg, when the locking device is in the locked position, the first and second legs extend through the tube and are positioned on circumferentially opposite sides of the rod.

2. The jack of claim 1, wherein the cylinder assembly includes at least one fluid passage extending through the rod for conveying pressurized fluid to the barrel.

3. The jack of claim 1, wherein the locking device is substantially U-shaped.

4. The jack of claim 1, wherein the locking device is inserted into the tube in a direction perpendicular to the longitudinal axis of the tube.

5. The jack of claim 1, wherein the first and second legs interfere with the barrel such that the barrel is mechanically blocked from moving relative to the rod in the second direction.

6. The jack of claim 1, wherein each of the first and second legs are in contact with two separate bearing regions of the tube, providing four total load bearing regions between the locking device and the tube.

7. The jack of claim 1, wherein the rod is radially spaced apart from an inner surface of the tube by an annular air gap, the barrel translating parallel to the longitudinal axis of the tube in the first and second directions within the annular air gap.

8. The jack of claim 7, wherein the locking device extends through the annular air gap.

9. The jack of claim 1, wherein the locking device includes a handle disposed exteriorly of the tube when the locking device is in the locked position.

10. The jack of claim 1, wherein the rod includes a piston positioned within the barrel, and wherein the cylinder assembly is a double-acting cylinder such that applying greater pressure on one side of the piston than the other side causes the barrel to move in the first direction, and applying greater pressure on the other side of the piston than the one side causes the barrel to move in the second direction.

11. A shuttle car comprising:
    a chassis;
    a bed for supporting material, the bed including a conveyor device for moving the material relative to the bed;
    traction members for supporting the chassis for movement; and
    a plurality of jacks secured to the chassis, each jack including,
        a tube coupled to the chassis,
        a cylinder assembly supported by the tube, the cylinder assembly including a barrel and a rod at least partially received within the barrel, actuation of the cylinder assembly causing the barrel to move relative to the tube in a first direction parallel to a longitudinal axis of the tube while the rod remains stationary relative to the tube, and
        a locking device selectively positionable in a locked position in which the locking device engages the tube and at least partially inhibits the barrel from moving in a second direction opposite the first direction, the locking device including a first leg and a second leg, when the locking device is in the second position, the first and second legs extend through the tube and are positioned on circumferentially opposite sides of the rod.

12. The shuttle car of claim 11, wherein the cylinder assembly includes at least one fluid passage extending through the rod for conveying pressurized fluid to the barrel.

13. The shuttle car of claim 11, wherein the locking device is inserted into the tube in a direction perpendicular to a direction of movement of the barrel.

14. The shuttle car of claim 11, wherein the first and second legs interfere with the barrel such that the barrel is mechanically blocked from moving relative to the rod in the second direction.

15. The shuttle car of claim 11, wherein each of the first and second legs are in contact with two separate bearing regions of the tube, providing four total load bearing regions between the locking device and the tube.

16. The shuttle car of claim 11, wherein the rod is radially spaced apart from an inner surface of the tube by an annular air gap, the barrel translating parallel to the longitudinal axis of the tube in the first and second directions within the annular air gap.

17. The shuttle car of claim 16, wherein the locking device extends through the annular air gap when in the second position.

18. The shuttle car of claim 11, wherein the rod includes a piston positioned within the barrel, and wherein the cylinder assembly is a double-acting cylinder such that applying greater pressure on one side of the piston than the other side causes the barrel to move in the first direction, and applying greater pressure on the other side of the piston than the one side causes the barrel to move in the second direction.

19. A jack for a vehicle having a chassis, the jack comprising:
   a tube configured to be coupled to the chassis;
   a cylinder assembly supported by the tube, the cylinder assembly including a barrel and a rod at least partially received within the barrel, actuation of the cylinder assembly causing the barrel to move relative to the tube in a first direction parallel to a longitudinal axis of the tube while the rod remains stationary relative to the tube; and
   a locking device selectively received within the tube, the locking device intersecting the barrel's path to inhibit movement of the barrel in a second direction opposite the first direction when the locking device is positioned within the tube, the locking device engaging at least one of the tube and the barrel in a plurality of bearing regions.

20. The jack of claim 19, wherein the cylinder assembly includes at least one fluid passage extending through the rod for conveying pressurized fluid to the barrel.

21. The jack of claim 19, wherein the locking device is inserted into the tube in a direction perpendicular to a direction of movement of the barrel.

* * * * *